B. C. ROCKWELL.
TRUCK.
APPLICATION FILED JAN. 7, 1911.
1,035,471.
Patented Aug. 13, 1912.
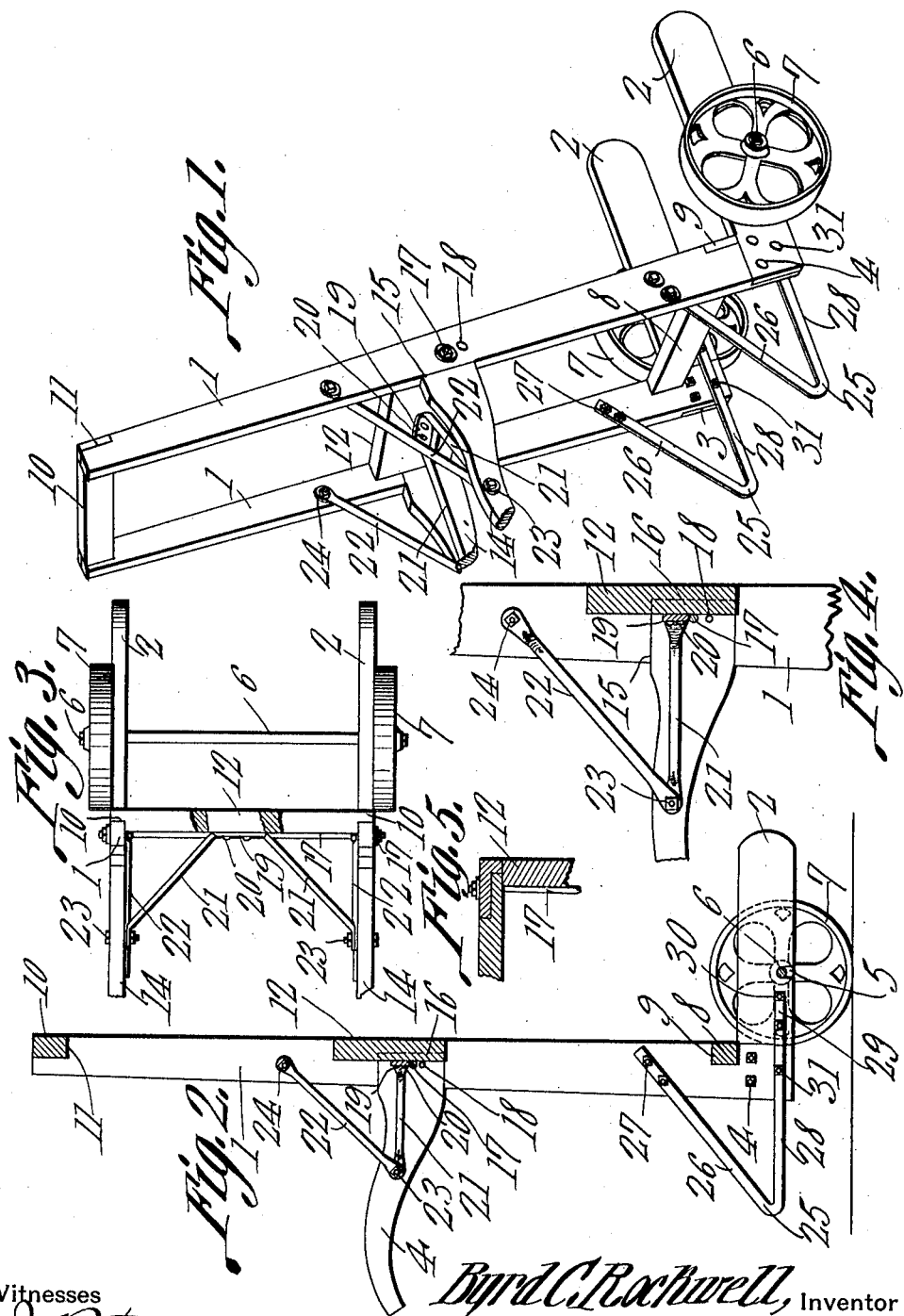
Witnesses
Byrd C. Rockwell, Inventor
by Attorneys

UNITED STATES PATENT OFFICE.

BYRD C. ROCKWELL, OF MALVERN, ARKANSAS.

TRUCK.

1,035,471. Specification of Letters Patent. Patented Aug. 13, 1912.

Application filed January 7, 1911. Serial No. 601,366.

*To all whom it may concern:*

Be it known that I, BYRD C. ROCKWELL, a citizen of the United States, residing at Malvern, in the county of Hot Spring and State of Arkansas, have invented a new and useful Truck, of which the following is a specification.

It is the object of this invention to provide a truck, the component elements of which are assembled in a novel and improved manner, to effect a rigid structure.

Another object of the invention is to provide a truck with a rearwardly projecting bracket, constituting at once, a means for limiting the rearward tilting of the truck, and a means for uniting certain elements of the truck.

Another object of the invention is to provide a truck so constructed that it may readily be pivoted to lift a load, and to dispose the center of gravity of the load above the axle of the truck without, however, permitting the truck to tilt rearwardly to an undesirable extent.

Another object of the invention is to provide novel means for uniting the standards which go to make up the body of the truck, and to provide means for uniting the standards with the truck handles.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective; Fig. 2 is a vertical longitudinal section, wherein sundry details appear in elevation; Fig. 3 is a top plan; Fig. 4 is a sectional detail enlarged from Fig. 2; and Fig. 5 is a fragmental section showing the manner in which the handles and the standards are united.

The body of the truck preferably comprises parallel upright standards 1, from the lower ends of which, arms 2 project forwardly, the arms being preferably mortised into the standards, adjacent the lower ends of the standards, as denoted by the numeral 3. The overlapped ends of the standards 1 and the arms 2 are united by bolts 4 or other securing elements adapted to a like end. In the lower edges of the arms 2, there are open notches 5, constituting bearings adapted to receive an axle 6, carrying wheels 7, the construction being such that the truck frame, as an entity, may, when desired, be readily removed from the axle 6. The invention further includes a lower cross bar 8, mortised into the standards 1, adjacent their points of union with the arms 2, as indicated by the numeral 9. An upper cross bar 10 unites the standards 1, adjacent their upper extremities, the upper cross bar being mortised into the standards, as shown at 11. An intermediate cross bar 12 is provided, the cross bar 12 being disposed between the standards 1. The truck body thus formed, is equipped with rearwardly projecting handles 14, preferably mortised into the standards 1, in the vicinity of the intermediate cross bar 12, as denoted by the numeral 15. As shown in clearest detail in Fig. 4, the forward ends of the handles 14 may be bound beneath the ends of the intermediate cross bar 12, as shown at 16.

A securing element 17, preferably a strap bolt, is extended through the standards 1, and through the extremities of the handles 14, the bolt 17 being, as shown clearly in Fig. 4, in abutment with the rear face of the intermediate cross bar 12, the bolt 17 thus serving, at once, as a means for securing the handles 14 to the standards 1, and as a means for holding in place, the intermediate cross bar 12. If desired, additional securing elements 18 may be employed for uniting the handles 14 with the standards 1, the securing elements being ordinarily short bolts, extending through the standards 1 and the handles 14.

The invention further includes an arched brace, the intermediate portion 19 of which is bolted or otherwise secured, as denoted by the numeral 20, to the intermediate cross bar 12. The portion 19 of the arched brace ordinarily rests upon the strap bolt 17, as clearly shown in Fig. 4. The rearwardly projecting, diverging arms 21 of the arched brace extends into abutment with the rearwardly projecting handles 14. Diagonal braces 22 are provided, the lower ends of which are attached to the handles 14 by a securing element 23 which serves, at the same time, as a means for binding the extremities of the arms 21 of the arched brace upon the handles. The upper ends of the diagonal braces 22 are bolted, or otherwise secured, as denoted by the numeral 23, to standards 1, above the intermediate cross bar 12.

The invention further includes a pair of V shaped brackets 25, the upper arms 26 of which are secured, as shown at 27, to the standards 1, above the arms 2. The lower segments 28 of the brackets 25 extend across the standards 1, and are overlapped upon the arms 2, as denoted by the numeral 29. Securing elements 30 unite the extended portions 29 of the segments 28 with the arms 2, and other securing elements 31 unite the segments 28 with the standards 1.

In practical operation, the truck may be tilted forwardly, from the position shown in Fig. 1, until the forward extremities of the arms 2 are depressed, so that they may readily be slid beneath the article which is to be lifted. When the article which is to be lifted is mounted upon the arms 2, the truck may be tilted rearwardly, so as to throw the center of gravity of the load above the axle 6, whereupon the truck may readily be wheeled about. The rearwardly projecting brackets 25 serve to prevent the truck from rotating rearwardly to an undesirable extent, the truck, when out of the hands of the operator, ordinarily assuming the position shown in Fig. 1, the rear extremities of the brackets 25 engaging the structure along which the wheels 7 move.

It is to be noted that the brackets 25 serve, not only as a means for limiting the rearward tilting of the truck, but, at the same time serve to unite the arms 2 with the standards 1 when, as shown in Fig. 2, the segments 28 of the brackets 25 are extended upon and secured to the arms 2, as shown at 29.

The construction shown in Fig. 4, and involving the diagonal braces 22, the arched brace, the handles 14, the intermediate cross bar 12, and the strap bolts 17, serve to effect a rigid union between the handles 14 and the body portion of the truck, the elements above specified, coöperating in a novel and improved manner to effect the desired result.

The brackets 25 constitute fulcrums, upon which the entire truck may be tilted rearwardly, thereby to elevate the arms 2, so as to lift the bearings 5 above the axle 6, whereupon the axle 6 together with the wheels 7, may be rolled from beneath the arms 2. The truck and its load may thus be permitted to stand in an upright position, the axle 6 and wheels 7 being mounted beneath another truck. The construction is such that a series of loaded trucks may be manipulated readily, to permit an interchange of axles and wheels. Comparatively few wheels and axles may be provided for a relatively large number of truck frames.

Having thus described the invention, what is claimed is:—

1. A truck including a body; arms outstanding from the body toward the front of the truck; wheels carried by the arms; brackets projecting rearwardly from the lower end of the body and constituting support-engaging elements, limiting the rearward tilting of the truck, the brackets being overlapped upon the body and the arms; and securing elements uniting the brackets with the arms and the body.

2. A truck including a body provided at its lower end with a forwardly extended portion, there being open bearings in the lower face of said forwardly extending portion; a shaft removably journaled for rotation in the bearings; a supporting wheel upon the shaft; and a bracket projecting rearwardly from the lower end of the body, the bracket constituting at once, a support-engaging element limiting the rearward gravitational tilting of the truck and a fulcrum upon which the truck may be manually tilted rearwardly, thereby to elevate the bearings and to effect the removal of the bearings from the axle.

In testimony that I claim the foregoing as my own, I have hereto affixed my signature in the presence of two witnesses.

BYRD C. ROCKWELL.

Witnesses:
N. M. YOUNG,
H. C. DARNELL.

Copies of this patent may be obtained for five cents each, by addressing the "Commissioner of Patents, Washington, D. C."